(12) United States Patent
Khish Ardestani Zadeh et al.

(10) Patent No.: US 11,699,081 B2
(45) Date of Patent: Jul. 11, 2023

(54) SYSTEMS AND METHODS FOR REDUCING DATA MOVEMENT DURING CONVOLUTION OPERATIONS IN ARTIFICIAL NEURAL NETWORKS

(71) Applicant: Meta Platforms, Inc., Menlo Park, CA (US)

(72) Inventors: Ehsan Khish Ardestani Zadeh, Sane Jose, CA (US); Martin Schatz, Seattle, WA (US); Krishnakumar Narayanan Nair, Newark, CA (US); Yuchen Hao, Fremont, CA (US); Abdulkadir Utku Diril, Menlo Park, CA (US); Rakesh Komuravelli, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 687 days.

(21) Appl. No.: 16/722,636

(22) Filed: Dec. 20, 2019

(65) Prior Publication Data

US 2021/0192359 A1 Jun. 24, 2021

(51) Int. Cl.
*G06N 3/02* (2006.01)
*G06N 3/10* (2006.01)
(Continued)

(52) U.S. Cl.
CPC .............. *G06N 3/10* (2013.01); *G06F 17/15* (2013.01); *G06N 3/04* (2013.01)

(58) Field of Classification Search
CPC ...................................................... G06F 17/00
See application file for complete search history.

(56) References Cited

U.S. PATENT DOCUMENTS

2012/0081535 A1* 4/2012 Hayashi ............ G02B 21/0044
348/79
2016/0379109 A1* 12/2016 Chung ................ G06F 15/7803
706/26
(Continued)

FOREIGN PATENT DOCUMENTS

| CN | 113011554 A | 6/2021 |
|---|---|---|
| EP | 3 489 862 A1 | 5/2019 |
| WO | 2019/085709 A1 | 5/2019 |

OTHER PUBLICATIONS

Extended European Search Report received for EP Patent Application Serial No. 20210580.5 dated Jul. 8, 2021, 10 pages.
(Continued)

*Primary Examiner* — Jae U Jeon
(74) *Attorney, Agent, or Firm* — Greenberg Traurig, LLP (57) ABSTRACT

The disclosed computer-implemented method may include (1) receiving, at a hardware accelerator that supports an ANN, an activation data set that is to undergo a convolution operation via a filter kernel of the ANN, (2) receiving, at the hardware accelerator, an argument indicating that the filter kernel exceeds at least one boundary of the activation data set when slid across a certain position during the convolution operation, (3) determining, based at least in part on the argument, that the hardware accelerator is to generate padding data at the boundary of the activation data set in connection with the certain position of the filter kernel, and then (4) performing, at the hardware accelerator, the convolution operation by processing a portion of the activation data set and the padding data when the filter kernel slides across the certain position. Various other systems and methods are also disclosed.

20 Claims, 7 Drawing Sheets

(51) Int. Cl.
*G06F 17/15* (2006.01)
*G06N 3/04* (2023.01)

(56) References Cited

U.S. PATENT DOCUMENTS

| | | | |
|---|---|---|---|
| 2018/0129893 A1* | 5/2018 | Son | G06V 10/95 |
| 2019/0163717 A1* | 5/2019 | Li | G06F 7/501 |
| 2019/0164045 A1* | 5/2019 | Li | G06N 20/10 |
| 2020/0151541 A1* | 5/2020 | Meng | G06F 17/15 |
| 2021/0192359 A1 | 6/2021 | Khish Ardestani Zadeh et al. | |

OTHER PUBLICATIONS

Chang et al., "Compiling Deep Learning Models for Custom Hardware Accelerators", Aug. 1, 2017, 8 pages.
Bai, Kunlun, "A Comprehensive Introduction to Different Types of Convolutions in Deep Learning", URL: https://towardsdatascience.com/a-comprehensive-introduction-to-different-types-of-convolutions-in-deep-learning-669281e58215, Feb. 11, 2019, pp. 1-42.

\* cited by examiner

SYSTEMS AND METHODS FOR REDUCING DATA MOVEMENT DURING CONVOLUTION OPERATIONS IN ARTIFICIAL NEURAL NETWORKS

BRIEF DESCRIPTION OF DRAWINGS AND APPENDIX

The accompanying Drawings illustrate a number of exemplary embodiments and are parts of the specification. Together with the following description, the Drawings demonstrate and explain various principles of the instant disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to systems and methods for reducing data movement during convolution operations in artificial neural networks. As will be explained in greater detail below, these systems and methods may provide numerous features and benefits.

Artificial intelligence (AI) may enable computers to perform various complicated tasks, such as those related to cognitive functions that are typically associated with humans. These functions often involve making predictions, classifications, or assessments based on real-world inputs. AI may involve and/or implement various approaches and/or techniques, such as machine learning, to achieve those functions. Machine learning systems, in at least some examples, may be trained using known data sets rather than employing a predetermined algorithm to perform a task.

One machine learning model, referred to as an artificial neural network (ANN), may be inspired by the interconnections of neurons in a biological brain. Typically, ANNs may include multiple computational nodes arranged in interconnected layers, with each node modeling a neuron that may receive one or more inputs, process the inputs, and pass an output to the next layer, with the final layer producing a desired output. One such layer included in ANNs is often referred to as a convolutional layer. A convolutional layer may apply a convolution operation to an input and/or pass the result to another layer.

Unfortunately, traditional approaches to performing such convolution operations may require and/or consume high amounts of computing and/or power resources. In some examples, traditional approaches may require and/or utilize components and/or computing techniques that consume a high amount of power, computing, and/or memory resources. Additionally, such resource intensive and/or demanding techniques may complicate the designs of systems that utilize such convolutional layers.

As a specific example, a computing device may implement an ANN for the purpose of identifying and/or classifying certain images and/or gestures. In this example, one component within the computing device may generate and/or prepare an input matrix (sometimes also referred to as activation data) for convolution to be performed by a hardware accelerator within the computing device. As part of this convolution in a traditional approach, the hardware accelerator may need to obtain and/or access not only the input matrix but also a certain amount of padding data that encompasses that input matrix. This padding data may enable the hardware accelerator to produce an output matrix that maintains the same dimensions as the input matrix during convolution. In this example, the obtaining and/or accessing of this padding data by the hardware accelerator may involve and/or necessitate data movement across the memory hierarchy of the ANN.

Unfortunately, such data movement may consume power and/or computing resources as well as introduce delays. The instant disclosure, therefore, identifies and addresses a need for additional and/or improved systems and methods for reducing data movement during convolution operations in artificial neural networks. For example, as will be described in greater detail below, the various systems and methods disclosed herein may notify a hardware accelerator of the boundaries of an input matrix convolved in an ANN implemented on a computing device. By doing so, these systems and methods may obviate the need to pass and/or transfer any padding data across the memory hierarchy of the ANN on the computing device. As a result, these systems and methods may enable the computing device to conserve power and/or computing resources in connection with the convolution operation and/or decreasing time delays associated with the convolution operation.

Figure 1:
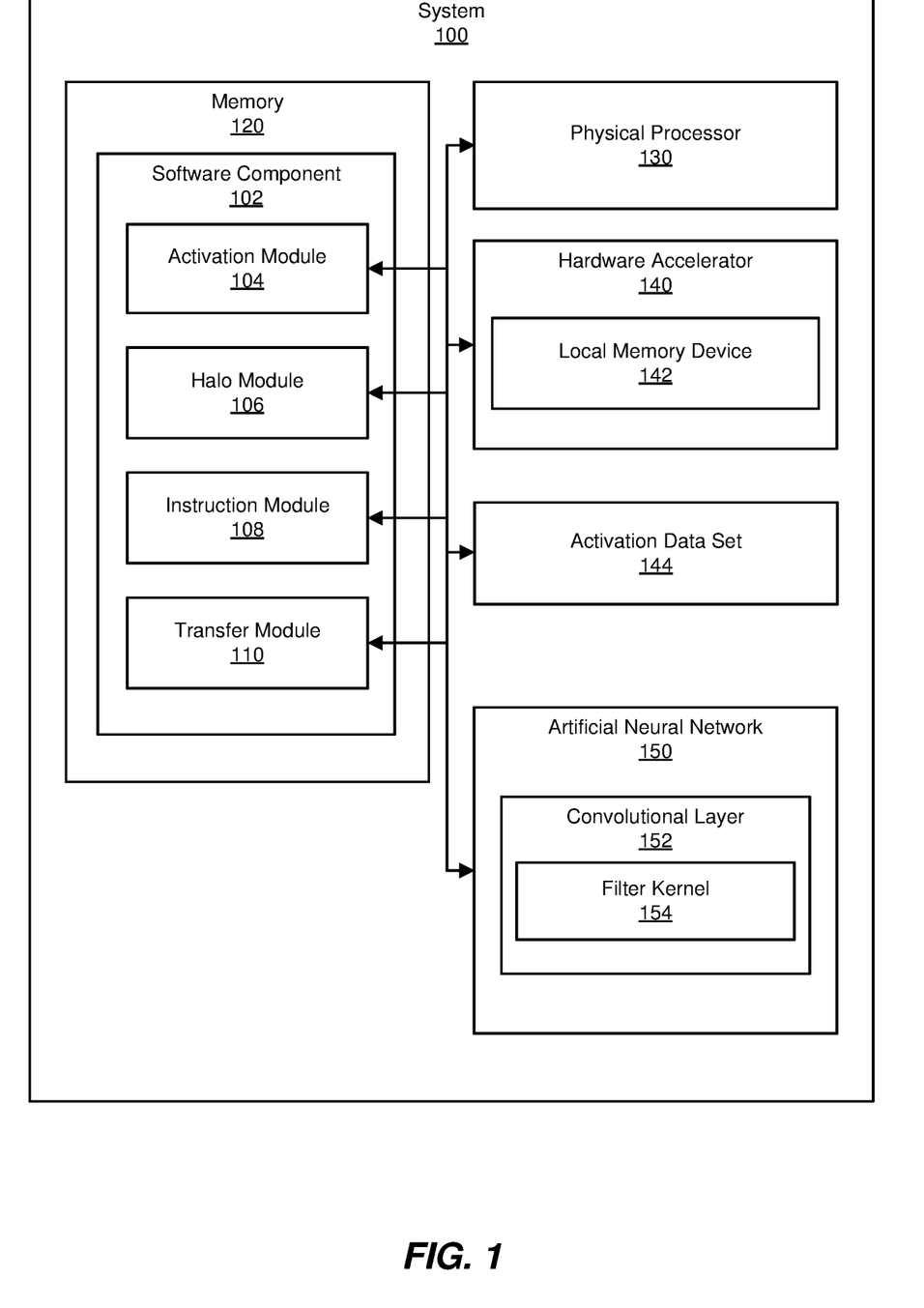
FIG. 1 is a block diagram of an exemplary system for reducing data movement during convolution operations in artificial neural networks.
Figure 2:
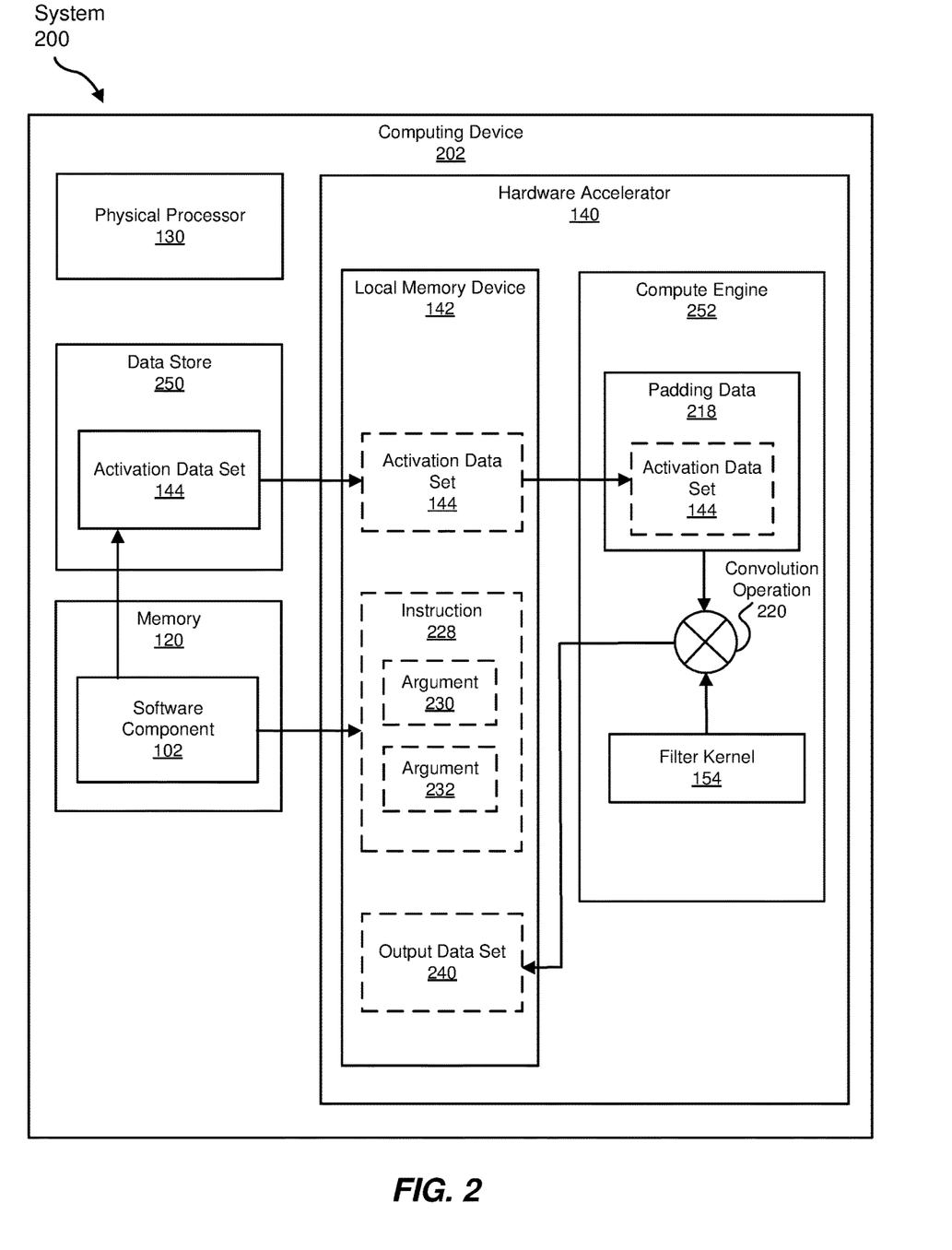
FIG. 2 is a block diagram of an exemplary system for reducing data movement during convolution operations in artificial neural networks.

The following will provide, with reference to FIGS. 1 and 2, detailed descriptions of various systems, components, and/or implementations capable of reducing data movement during convolution operations in ANNs. The discussion corresponding to FIG. 3 will provide detailed descriptions of an exemplary method for reducing data movement during convolution operations in ANNs. The discussion corresponding to FIGS. 4-7 will provide detailed descriptions of exemplary convolution operations that necessitate reduced data movement in ANNs.

FIG. 1 is a block diagram of an exemplary system 100 for reducing data movement during convolution operations in ANNs. As illustrated in this figure, exemplary system 100 may include one or more software components, such as software component 102, for performing one or more tasks. As will be explained in greater detail below, software component 102 may include an activation module 104, a halo module 106, an instruction module 108, and/or a transfer module 110. Although illustrated as separate elements, one or more of the modules included in software component 102 in FIG. 1 may represent portions of a single module, application, and/or operating system. Alternatively, one or more of the modules included in software component 102 in FIG. 1 may represent separate, distinct, and/or individual applications or operating systems.

In certain embodiments, one or more of the modules included in software component 102 in FIG. 1 may represent one or more software applications or programs that, when executed by a processor of a computing device, cause the computing device to perform one or more tasks. For example, and as will be described in greater detail below, one or more of the modules included in software component 102 may represent modules stored and configured to run on one or more computing devices, such as the devices or components illustrated in FIG. 2 (e.g., computing device 202, physical processor 130, etc.). One or more of the modules included in software component 102 in FIG. 1 may also represent all or portions of one or more special-purpose computers configured to perform one or more tasks.

As illustrated in FIG. 1, exemplary system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of the modules included in software component 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of the modules included in software component 102 stored in memory 120. Additionally or alternatively, physical processor 130 may execute one or more of the modules included in software component 102 to facilitate reducing data movement during convolution operations in ANNs. Physical processor 130 may support and/or contribute to an ANN. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), Systems on a Chip (SoCs), portions of one or more of the same, variations or combinations of one or more of the same, and/or any other suitable physical processor.

As illustrated in FIG. 1, exemplary system 100 may also include one or more hardware accelerators, such as hardware accelerator 140. In some examples, hardware accelerator 140 may include and/or represent a hardware component or device that performs one or more specialized computing tasks more efficiently, in hardware, than the computing task would be performed in software by a general-purpose central processing unit (i.e., a computing chip that is structured to execute a range of different programs as software). In such examples, hardware accelerator 140 may support and/or contribute to an ANN. In some embodiments, the term "hardware acceleration" may refer to the execution of a computing task in application-specific hardware circuitry (e.g., an ASIC) that occurs in the absence of a software module intermediary or other layer of abstraction such that the performance of the computing task is more efficient than when executed otherwise.

In some examples, as shown in FIG. 1, hardware accelerator 140 may include one or more local memory devices, such as local memory device 142. Local memory device 142 may represent any type or form of volatile or non-volatile storage device or medium capable of storing data and/or computer-readable instructions. In one example, local memory device 142 may store, load, receive, and/or maintain one or more matrices that may be local to (e.g., communicatively coupled via a high-speed, low-power, and/or low-latency bus), accessed, and/or utilized by one or more compute engines included in hardware accelerator 140.

Examples of local memory device 142 include, without limitation, one or more RAM devices included in a hardware accelerator, one or more physical memory devices organized in one or more cache levels, a general cache, an instruction cache, variations or combinations of one or more of the same, and/or any other suitable storage memory device local to a hardware accelerator. In some examples, it may be more efficient (e.g., in terms of power usage, processing resource usage, etc.), for one or more components of system 100 and/or hardware accelerator 140 to access data and/or computer-readable instructions from local memory device 142 than to access data and/or computer-readable instructions from another data storage device that is external to hardware accelerator 140 (e.g., memory 120, an external data store, etc.).

As illustrated in FIG. 1, exemplary system 100 may also include one or more activation data sets, such as activation data set 144. In some examples, activation data set 144 may include and/or represent a set of data that serves and/or functions as input for a convolutional layer of an ANN. For example, activation data set 144 may include and/or represent one or more digital images. Additionally or alternatively, activation data set 144 may include and/or represent digital representations of gestures or user-interface commands.

In some examples, activation data set 144 may be arranged, organized, and/or formatted into or as a matrix. In one example, activation data set 144 may be arranged and/or provided in a 2-dimensional (2D) form of H×W, where H represents the number of rows in the input matrix and W represents the number of columns in the input matrix (e.g., 8×8, 16×16, 64×64, and so forth). Accordingly, the H dimension of activation data set 144 may correspond to the height of the input matrix, and the W dimension of activation data set 144 may correspond to the width of the input matrix.

In another example, activation data set 144 may be arranged and/or provided in a 3-dimensional (3D) form of H×W×C, where H represents the number of rows in the input matrix, W represents the number of columns in the input matrix, and C represents the number or depth of channels in the input matrix (e.g., 8×8×8, 16×16×16, 64×64×16, and so forth). Accordingly, the H dimension of activation data set 144 may correspond to the height of the input matrix, the W dimension of activation data set 144 may correspond to the width of the input matrix, and the C dimension of activation data set 144 may correspond to the depth of the input matrix.

As illustrated in FIG. 1, exemplary system 100 may additionally include one or more ANNs, such as ANN 150. In some examples, ANN 150 may include and/or represent a collection of layers (such as input layers, pooling layers, hidden layers, convolution layers, fully connected layers, normalization layers, downsampling layers, rectified linear unit layers, loss layers, etc.). In one example, ANN 150 may include, involve, and/or implement a convolutional layer 152 at which a filter kernel 154 is applied to and/or slid across or over activation data set 144 to facilitate classifying activation data set 144 in one way or another. Examples of ANN 150 include, without limitation, convolutional neural networks, deep neural networks, multilayer perceptrons, recursive neural networks, recurrent neural networks, variations or combinations of one or more of the same, and/or any other suitable ANN.

In some examples, software component 102 may correspond to and/or support an input layer of ANN 150. In such examples, hardware accelerator 140 may correspond to and/or support convolutional layer 152 of ANN 150. Additionally or alternatively, the input layer of ANN 150 may link to and/or feed convolutional layer 152 of ANN 150. Accordingly, the input layer of ANN 150 may prepare activation data set 144 for convolution and then send activation data set 144 to convolutional layer 152 of ANN 150.

An apparatus for reducing data movement during convolution operations in ANNs may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include and/or represent a computing device 202 that implements, deploys, and/or executes ANN 150. In one example, system 200 may include and/or incorporate memory 120, physical processor 130, and/or hardware accelerator 140. In this example, computing device 202 may also include and/or incorporate a data store 250 that is external to hardware accelerator 140. In some embodiments, local memory device 142 and data store 250 may constitute and/or represent some or all of the memory hierarchy of ANN 150 implemented on computing device 202.

In some examples, and as will be described in greater detail below, hardware accelerator 140 of computing device 202 may be configured, programmed, and/or hardwired to perform one or more tasks and/or operations that facilitate reducing data movement during convolution operations in ANNs. For example, to achieve such a reduction of data movement, hardware accelerator 140 of computing device 202 may (1) receive activation data set 144 that is to undergo a convolution operation 220 via filter kernel 154 of ANN 150, (2) receive an argument indicating that filter kernel 154 exceeds at least one boundary of activation data set 144 when slid across a certain position during convolution operation 220, (3) determine, based at least in part on the argument, that hardware accelerator 140 is to generate padding data at the boundary of activation data set 144 in connection with the certain position of filter kernel 154, and then (4) perform convolution operation 220 by processing a portion of activation data set 144 and the padding data when filter kernel 154 slides across the certain position.

In some examples, computing device 202 may generally represent any type or form of physical computing device capable of reading computer-executable instructions. Examples of computing device 202 include, without limitation, application servers, storage servers, database servers, web servers, and/or any other suitable server configured to run certain software applications and/or provide various application, storage, and/or database services. Additional examples of computing device 202 include, without limitation, client devices, gaming consoles, wearable devices, head-mounted headsets, artificial reality systems (e.g., augmented reality systems, mixed reality systems, virtual reality systems, etc.), laptops, tablets, desktops, cellular phones, routers, switches, Personal Digital Assistants (PDAs), multimedia players, embedded systems, variations or combinations of one or more of the same, and/or any other suitable computing device.

In one example, computing device 202 may be programmed with one or more of the modules included in software component 102. All or a portion of the functionality of the modules included in software component 102 may be performed by computing device 202 and/or any other suitable computing system. As will be described in greater detail below, one or more of the modules included in software component 102 from FIG. 1 may, when executed by at least one processor of computing device 202, enable computing device 202 to reduce data movement during convolution operations in ANNs.

Many other devices or subsystems may be connected to exemplary system 100 in FIG. 1 and/or exemplary system 200 in FIG. 2. Conversely, all the components and devices illustrated in FIGS. 1 and 2 need not be present to practice the embodiments described and/or illustrated herein. The devices and subsystems referenced above may also be interconnected in different ways from those shown in FIG. 2. Exemplary system 100 and exemplary system 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
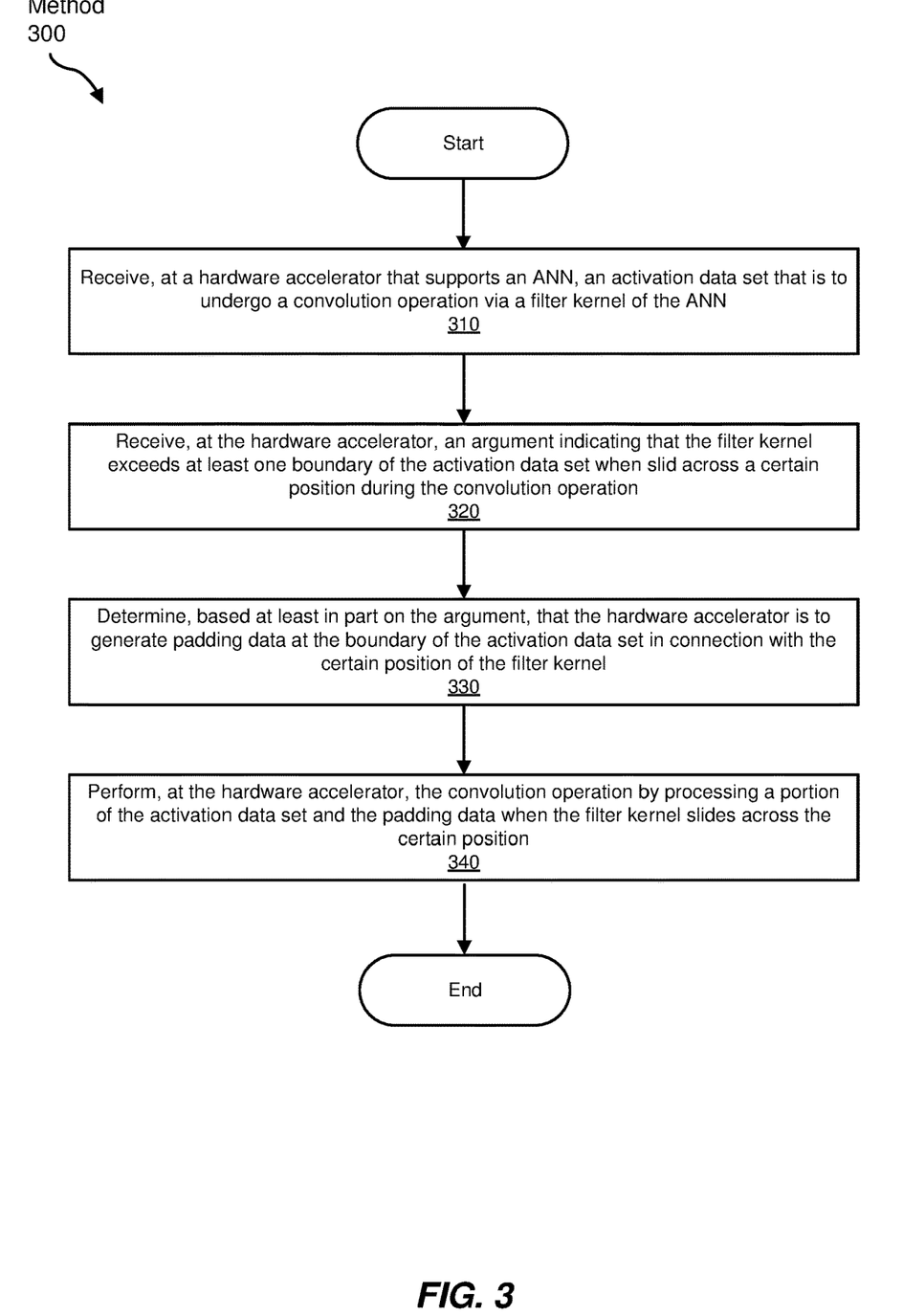
FIG. 3 is a flow diagram of an exemplary method for reducing data movement during convolution operations in artificial neural networks.

FIG. 3 is a flow diagram of an example computer-implemented method 300 for reducing data movement during convolution operations in ANNs. The steps shown in FIG. 3 may be performed by any suitable computer-executable code and/or computing system, including exemplary system 100 in FIG. 1, exemplary system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may receive an activation data set that is to undergo a convolution operation via a filter kernel of the ANN. For example, hardware accelerator 140 of computing device 202 may receive activation data set 144 that is to undergo a convolution operation 220 in FIG. 2 via filter kernel 154. In one example, activation data set 144 may constitute and/or represent all or a portion of a photograph and/or a computer-generated image. Additionally or alternatively, activation data set 144 may constitute and/or represent a digital depiction of a gesture or a user-interface command.

The systems described herein may perform step 310 in a variety of ways and/or contexts. In some examples, hardware accelerator 140 of computing device 202 may obtain and/or access activation data set 144 from data store 250. In other examples, software component 102 may direct and/or cause data store 250 to transfer activation data set 144 to hardware accelerator 140. In either case, hardware accelerator 140 may store and/or maintain activation data set 144 in local memory device 142.

As illustrated in FIG. 2, local memory device 142 may reside within and/or represent part of hardware accelerator 140. In contrast, data store 250 may reside outside and/or external to hardware accelerator 140. Accordingly, the transfer of activation data set 144 from data store 250 to local memory device 142 may constitute data movement across the memory hierarchy of ANN 150.

In some examples, software component 102 may be involved in generating, preparing, and/or arranging activation data set 144 for convolution operation 220. For example, activation module 104 of software component 102 may generate, prepare, and/or arrange activation data set 144 outside and/or external to hardware accelerator 140. Upon completion of the generation, preparation, and/or arrangement of activation data set 144, transfer module 110 of software component 102 may pass and/or transfer activation data set 144 from data store 250 to hardware accelerator 140.

In some examples, activation data set 144 may be passed and/or transferred from data store 250 to hardware accelerator 140 without any padding data. In other words, activation data set 144 may be devoid of padding data upon arriving at hardware accelerator 140. Accordingly, computing device 202 may be able to achieve and/or perform convolution operation 220 on activation data set 144 without such padding data across the memory hierarchy of ANN 150. By doing so, computing device 202 may be able to reduce the amount of data movement involved in convolution operations relative to traditional convolution technologies.

Returning to FIG. 3, at step 320, one or more of the systems described herein may receive an argument indicating that the filter kernel exceeds at least one boundary of the activation data set when slid across a certain position during the convolution operation. For example, hardware accelerator 140 of computing device 202 may receive an argument 230 in FIG. 2 indicating that filter kernel 154 exceeds at least one boundary of activation data set 144 when slid across a certain position during convolution operation 220. As will be described in greater detail below, argument 230 may include various types or forms of information and/or data used by hardware accelerator 140 to determine whether a certain position of filter kernel 154 includes and/or contains any area or scope outside and/or beyond the boundaries of activation data set 144.

The systems described herein may perform step 320 in a variety of ways and/or contexts. In some examples, hardware accelerator 140 of computing device 202 may obtain and/or retrieve argument 230 via an instruction 228 from software component 102. Additionally or alternatively, hardware accelerator 140 may detect and/or identify argument 230 within instruction 228 sent by software component 102.

As a specific example, halo module 106 of software component 102 may determine, define, and/or identify the boundaries of activation data set 144. In this example, instruction module 108 of software component 102 may generate and/or prepare instruction 228 to account for and/or identify one or more of the boundaries of activation data set 144. Specifically, instruction module 108 may insert and/or incorporate argument 230 into instruction 228 prior to sending the same to hardware accelerator 140.

Continuing with this example, argument 230 may indicate and/or identify one or more memory locations at which activation data set 144 is stored in data store 250 and/or local memory device 142. For example, argument 230 may indicate and/or identify a memory location at which the first row of data included in activation data set 144 begins relative to data store 250 and/or local memory device 142. In other words, argument 230 may indicate and/or identify a memory location that stores the first matrix element included in activation data set 144.

Additionally or alternatively, argument 230 may indicate and/or identify a memory location at which the last row of data included in activation data set 144 ends relative to data store 250 and/or local memory device 142. In other words, argument 230 may indicate and/or identify a memory location that stores the last matrix element included in activation data set 144.

In one example, instruction module 108 of software component 102 may determine and/or select which padding value (e.g., zeros and/or non-zero values) to use as padding data and/or for the halo. For example, instruction module 108 may select a non-zero value of "13" to use as padding data and/or for the halo. In this example, instruction module 108 may direct hardware accelerator 140 to generate padding data and/or a halo using the padding value selected by software component 102. Specifically, instruction module 108 may insert and/or incorporate the selected padding value into instruction 228 prior to sending the same to hardware accelerator 140.

Upon generating and/or preparing instruction 228 to account for and/or identify the boundaries of activation data set 144, instruction module 108 may send and/or pass instruction 228 to hardware accelerator 140. Additionally or alternatively, transfer module 110 may send and/or pass instruction 228 to hardware accelerator 140. In one example, hardware accelerator 140 may search instruction 228 for any arguments relative to the boundaries of activation data set 144. During this search, hardware accelerator 140 may identify argument 230 and then determine that argument 230 indicates and/or identifies one or more boundaries of activation data set 144 relative to the memory locations of data store 250 and/or local memory device 142.

In one example, argument 230 may include and/or represent a flag indicating whether the position corresponding to a certain sub-region involves any area or scope outside and/or beyond the boundaries of activation data set 144. In other words, this flag may indicate and/or convey whether a certain sub-region undergoing convolution necessitates any padding data to ensure the integrity of same convolution. The term "same convolution" may refer to the concept, process, and/or proposition of producing an output from convolution that includes and/or maintains the same data dimensions as the corresponding input.

In another example, argument 230 may include and/or represent a count indicating the number of boundaries of activation data set 144 that filter kernel 154 exceeds when slid across the certain position during the convolution operation. Additionally or alternatively, argument 230 may include and/or represent one or more side indicators (e.g., "halo_top", "halo_bottom", "halo_left", and/or "halo_right") identifying which boundaries of activation data set 144 that filter kernel 154 exceeds when slid across the certain position during the convolution operation. Moreover, argument 230 may include and/or represent a depth indicator identifying a depth of the padding data to be generated by hardware accelerator 140 at one or more boundaries of activation data set 144 in connection with the certain position of filter kernel 154.

In some examples, instruction 228 may correspond to and/or represent all of activation data set 144. For example, instruction 228 may include and/or convey various arguments that indicate and/or identify all the boundaries of activation data set 144 relative to the memory locations of data store 250 and/or local memory device 142. In this example, instruction 228 may communicate to hardware accelerator 140 which positions of filter kernel 154 envelopes and/or covers any area or scope outside and/or beyond the boundaries of activation data set 144.

In other words, instruction 228 may indicate all the positions of filter kernel 154 that envelope and/or cover any area and/or scope that is typically filled with padding data for same convolution operations. Accordingly, in this example, hardware accelerator 140 may be able to identify and/or determine all such boundaries of activation data set 144 based on just instruction 228—without the need for any additional instructions from software component 102.

In other examples, instruction 228 may correspond to and/or represent just a portion and/or subset of activation data set 144. For example, instruction 228 may include and/or carry just argument 230 and/or an argument 232, which are directed to the memory location(s) storing a certain portion of activation data set 144. In this example, instruction 228 may communicate to hardware accelerator 140 whether filter kernel 154, when slid across or to a certain position during convolution operation 220, envelopes and/or is applied to any area or scope outside and/or beyond the boundaries of activation data set 144.

In other words, instruction 228 may indicate whether a single position of filter kernel 154 covers any area and/or scope that is typically filled with padding data for same convolution operations. Accordingly, hardware accelerator 140 may be able to identify and/or determine whether a single position of filter kernel 154 envelopes and/or covers any area or scope outside and/or beyond the boundaries of activation data set 144 based on instruction 228. As a result, in this example, hardware accelerator 140 may need to receive and/or obtain additional instructions from software component 102 to facilitate accounting for and/or generating padding data for the entirety of activation data set 144.

In some examples, hardware accelerator 140 may receive argument 232 in FIG. 2 indicating a starting address of the certain position where filter kernel 154 exceeds activation data set 144 during convolution operation 220. As a specific example, halo module 106 of software component 102 may determine, define, and/or identify the starting address of activation data set 144. In this example, the starting address may correspond to and/or account for the halo region or portion of activation data set 144. Additionally or alternatively, halo module 106 may determine, define, and/or identify the starting address of a sub-region of activation data set 144. In this example, the sub-region may correspond to and/or represent a certain area or portion of activation data set 144.

In some examples, the sub-region may include and/or represent the same dimensions as filter kernel 154. For example, if filter kernel 154 includes and/or represents a 3×3 matrix filter, the sub-region may include and/or represent a 3×3 matrix of activation data set 144. As another example, if filter kernel 154 includes and/or represents an 8×8×K matrix filter, the sub-region may include and/or represent an 8×8×C matrix of activation data set 144, where K represents the number of kernels in convolution and/or the number of channels to output and C represents the number or depth of channels included activation data set 144. In this example, K and C may have a certain relationship and/or proportionality with one another.

In some examples, instruction module 108 of software component 102 may then generate and/or prepare instruction 228 to account for and/or identify the starting address of the certain position where filter kernel 154 exceeds activation data set 144 during convolution operation 220. Specifically, instruction module 108 may insert and/or incorporate argument 232 into instruction 228 prior to sending the same to hardware accelerator 140. In one example, argument 232 may indicate and/or identify a memory location at which the first matrix element of a region or sub-region of activation data set 144 is stored in data store 250 and/or local memory device 142.

Returning to FIG. 3, at step 330, one or more of the systems described herein may determine, based at least in part on the argument, that the hardware accelerator is to generate padding data at the boundary of the activation data set in connection with the certain position of the filter kernel. For example, hardware accelerator 140 of computing device 202 may determine that hardware accelerator 140 is to generate padding data 218 at the boundary of activation data set 144 in connection with the certain position of filter kernel 154 based at least in part on argument 230. In other words, hardware accelerator 140 may account for padding data 218 at the boundary of activation data set 144 based at least in part on argument 230 to ensure the integrity of convolution operation 220 without necessitating the transfer of such padding data from data store 250 or elsewhere.

In some embodiments, padding data 218 may include and/or represent zero-offset padding. For example, padding data 218 may include and/or represent an array, matrix, volume of zeros, and/or non-zero values. In this example, hardware accelerator 140 may be configured, programmed, and/or designed to add an array, matrix, and/or volume of a known padding type (e.g., known zeros, known ones, and/or known negative ones) around activation data set 144. Additionally or additionally, hardware accelerator 140 may be configured, programmed, and/or designed to add padding data of a certain depth and/or dimension around activation data set 144.

The systems described herein may perform step 330 in a variety of ways and/or contexts. In some examples, hardware accelerator 140 of computing device 202 may generate and/or account for padding data 218 at all the boundaries of activation data set 144 at the outset of convolution operation 220. For example, prior to applying filter kernel 154 to activation data set 144, hardware accelerator 140 may generate and/or populate padding data 218 to encompass and/or surround activation data set 144 in 2D or 3D in preparation for convolution operation 220.

In some examples, hardware accelerator 140 may generate and/or account for padding data 218 on a per-position basis during convolution operation 220. In other words, hardware accelerator 140 may add padding data 218 to one or more boundaries of activation data set 144 at the time that filter kernel 154 is slid across and/or applied to a position that includes and/or contains any area or scope outside and/or beyond such boundaries of activation data set 144 during convolution operation 220. For example, if filter kernel 154 is slid across and/or applied to a position that is fully contained within the boundaries of activation data set 144, hardware accelerator 140 may have no need to generate and/or account for any padding data in connection with that position during convolution operation 220. As a result, hardware accelerator 140 may simply perform convolution on activation data set 144 at that position because no padding data is needed to ensure the integrity of same convolution.

However, if filter kernel 154 is slid across and/or applied to a position in which filter kernel 154 extends beyond one or more boundaries of activation data set 144, hardware accelerator 140 may need to generate and/or account for padding data in connection with that position during convolution operation 220. For example, hardware accelerator 140 may add zeros or ones to the area around one or more boundaries of activation data set 144 that are implicated by a certain position of filter kernel 154 during convolution operation 220. Upon doing so, hardware accelerator 140 may be able to perform and/or execute convolution at that position without compromising the integrity and/or dimensions of the output.

In some examples, hardware accelerator 140 may determine the window size of filter kernel 154 based at least in part on argument 230. For example, hardware accelerator 140 may determine the window size of filter kernel 154 based at least in part on the halo count identified in argument 230 for a certain position during convolution operation 220. In this example, hardware accelerator 140 may make that determination based at least in part on this formula: $Window_{input} = Window_{output} + left_{halo}?0: (F-1)>>2 + right_{halo}?0: (F-1)>>2$, where F is the total size of the filter. Upon determining the window size of filter kernel 154 in this way, hardware accelerator 140 may generate halo data (e.g., null data and/or zero-offset data) based at least in part on the window size. This halo data may then be inputted into convolution operation 220 for the purpose of supporting same convolution from input to output.

In these ways, software component 102 and hardware accelerator 140 may work and/or operate in conjunction with one another to avoid the movement of padding data across the memory hierarchy of ANN 150 implemented on computing device 202 while still facilitating same convolution by ANN 150. Accordingly, software component 102 and hardware accelerator 140 may effectively obviate the need to pass and/or transfer such padding data across the memory hierarchy of ANN 150 (e.g., from data store 250 to local memory device 142) on computing device 202. By doing so, software component 102 and hardware accelerator 140 may enable computing device 202 to conserve power and/or computing resources in connection with convolution operation 220 and/or decrease time delays associated with convolution operation 220.

Returning to FIG. 3, at step 340, one or more of the systems described herein may perform the convolution operation by processing a portion of the activation data set and the padding data when the filter kernel slides across the certain position. For example, hardware accelerator 140 of computing device 202 may perform convolution operation 220 by processing a portion of activation data set 144 and padding data 218 when filter kernel 154 slides across the certain position. In this example, convolution operation 220 may effectively convolve activation data set 144 into an output data set 240. In other words, convolution operation 220 may consume activation data set 144 to generate and/or produce output data set 240. ANN 150 may then use output data set 240 to classify activation data set 144 or its origin in one way or another and/or to make a decision in connection with activation data set 144.

The systems described herein may perform step 340 in a variety of ways and/or contexts. In some examples, hardware accelerator 140 may include and/or deploy a compute engine 252 that performs and/or executes convolution operation 220. For example, compute engine 252 of hardware accelerator 140 may apply filter kernel 154 to activation data set 144 and/or a sub-region of activation data set 144. In this example, compute engine 252 may input activation data set 144 into filter kernel 154 to generate and/or produce output data set 240. Additionally or alternatively, compute engine 252 may slide filter kernel 154 across filter kernel 154 to generate and/or produce output data set 240 as part of convolution operation 220.

Figure 4:
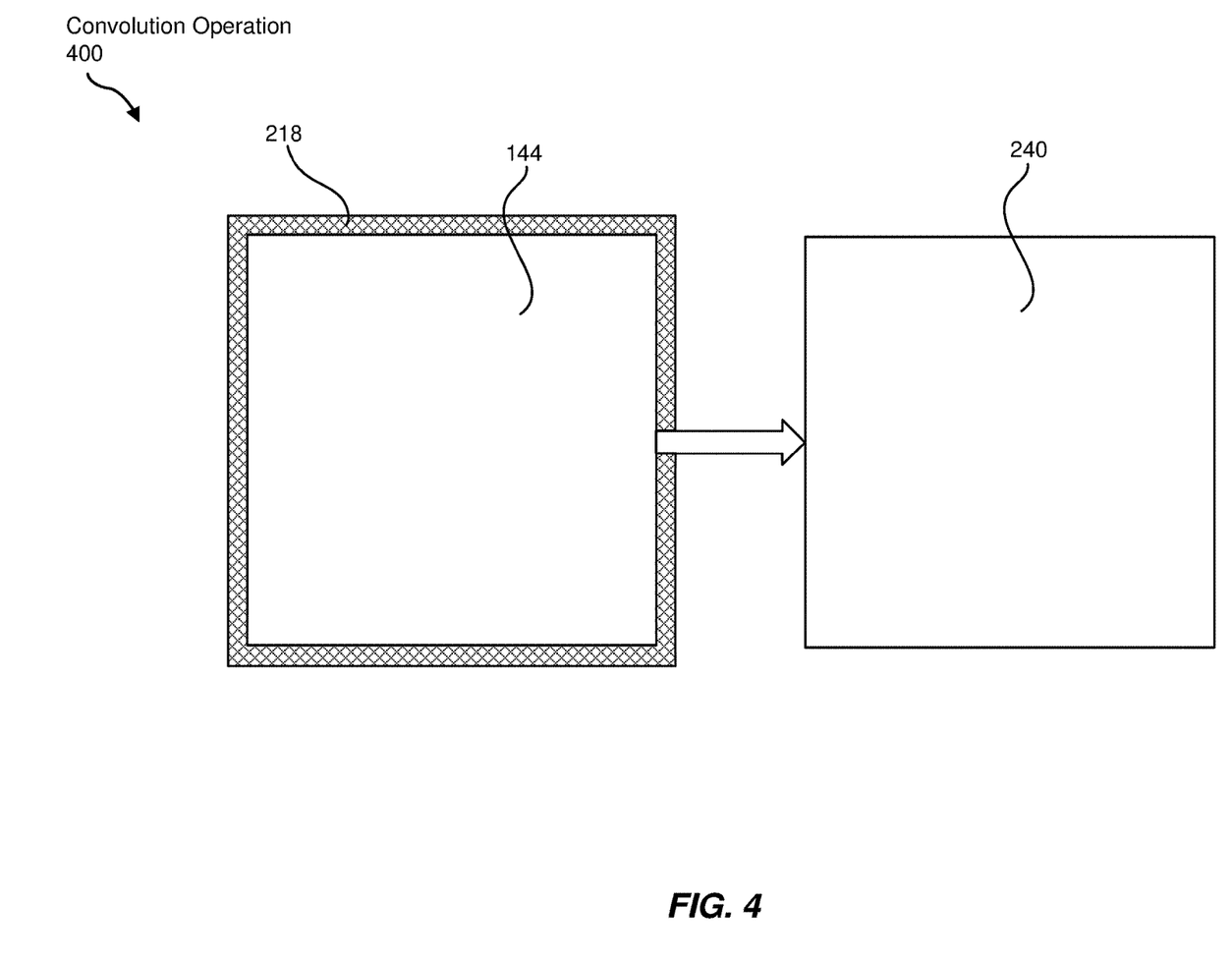
FIG. 4 is a block diagram of an exemplary convolution operation performed by an artificial neural network.

FIG. 4 illustrates an exemplary convolution operation 400 that involves activation data set 144, padding data 218, and/or output data set 240. In one example, activation data set 144, padding data 218, and/or output data set 240 in FIG. 4 may represent and/or be formatted as 2D data maps and/or matrices. In this example, hardware accelerator 140 may perform and/or execute convolution operation 400 in FIG. 4 by processing activation data set 144 and padding data 218 via filter kernel 154. Upon processing activation data set 144 and padding data 218 in this way, convolution operation 220 may generate, produce, and/or yield output data set 240.

Figure 5:
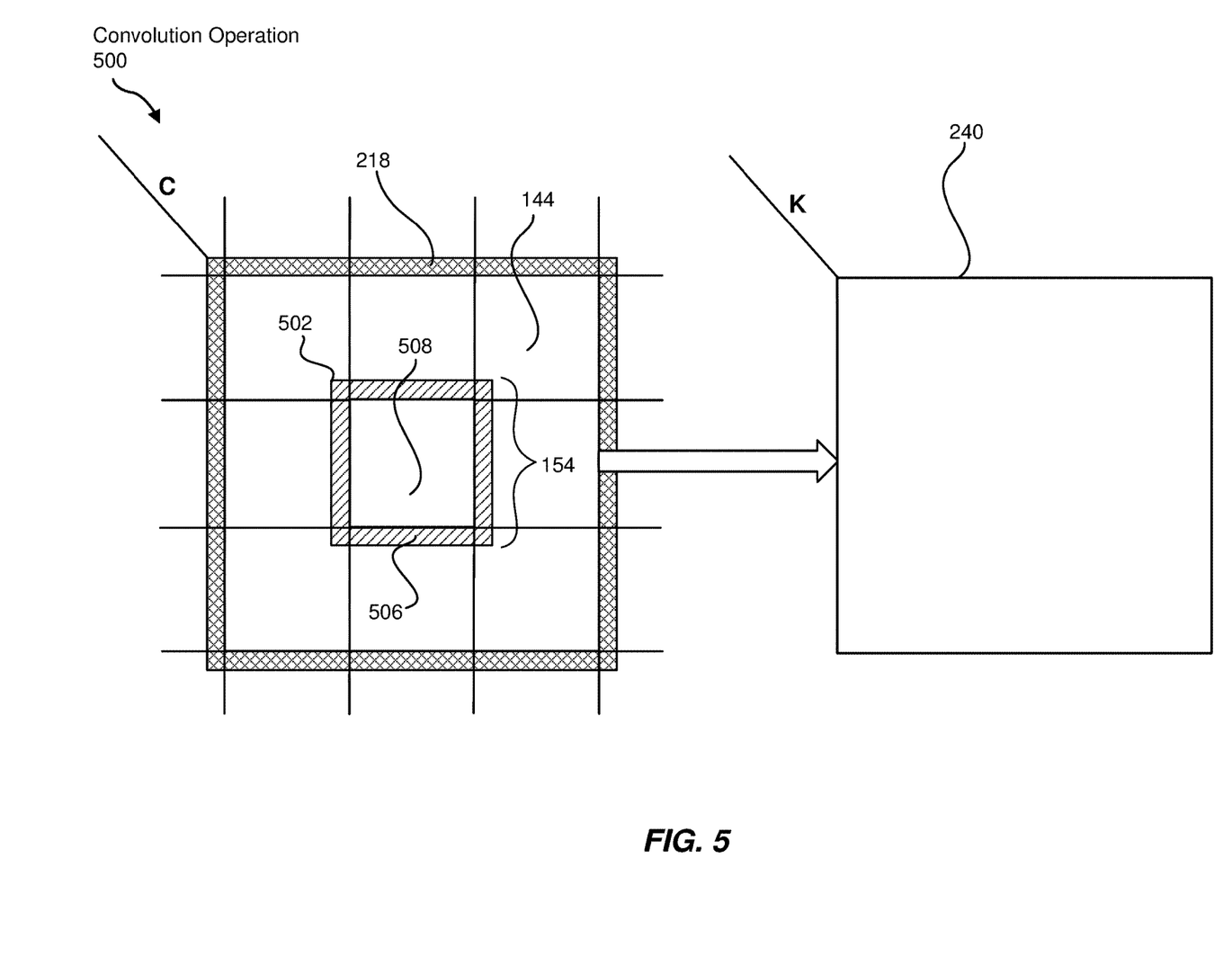
FIG. 5 is a block diagram of an exemplary convolution operation performed by an artificial neural network.

FIG. 5 illustrates an exemplary pass of convolution operation 500 that involves activation data set 144, padding data 218, and/or output data set 240. In one example, activation data set 144, padding data 218, and/or output data set 240 in FIG. 5 may represent and/or be formatted as 3D data maps and/or volumes. In this example, hardware accelerator 140 may perform and/or execute convolution operation 500 in FIG. 5 by processing activation data set 144 and padding data 218 via filter kernel 154. Upon processing activation data set 144 and padding data 218 in this way, convolution operation 500 may generate, produce, and/or yield output data set 240.

As part of convolution operation 500, hardware accelerator 140 may slide filter kernel 154 across various positions in memory to process the portions of activation data set 144 stored at those positions. In other words, hardware accelerator 140 may slide filter kernel 154 across various sub-regions of activation data set 144 to process the data corresponding to those sub-regions. Accordingly, the various memory locations in local memory device 142 may correspond to and/or represent various sub-regions of activation data set 144.

In one example, hardware accelerator 140 may receive argument 230 from software component 102. In this example, argument 230 may indicate and/or be used to determine that, at a position 508 of convolution operation 500, filter kernel 154 does not exceed any boundaries of activation data set 144. In other words, argument 230 may indicate and/or be used to determine that, at position 508 of convolution operation 500, filter kernel 154 envelopes and/or covers only area or scope inside and/or within the boundaries of activation data set 144. Accordingly, and as illustrated in FIG. 5, the data over which filter kernel 154 is slid and/or applied at position 508 is fully contained within the boundaries of activation data set 144.

In some examples, convolution operation 500 may necessitate and/or consume more input data than is produced as output data. Accordingly, convolution operation 500 may naturally reduce the data dimensions from input to output unless the input data dimensions are increased and/or expanded by way of a halo and/or padding data. As illustrated in FIG. 5, position 508 of convolution operation 500 may include and/or incorporate a halo 506 that extends the input portion of activation data set 144 to slightly larger dimensions than the corresponding output. In this way, halo 506 may be able to preserve and/or ensure the integrity of same convolution for convolution operation 500.

Continuing with this example, argument 230 may include and/or identify four parameters that correspond to and/or represent all sides of the sub-region of activation data set 144 undergoing convolution at position 508. For example, argument 230 may indicate that none of the top, left, right, and/or bottom sides at position 508 necessitate any padding data to support same convolution. The reason that no padding data is necessary at position 508 may be that activation data set 144 already includes and/or contains existing data at those sides of position 508. In other words, when filter kernel 154 slides across and/or is applied to position 508 of convolution operation 500, halo 506 may cover existing data maintained within the boundaries of activation data set 144.

Additionally or alternatively, hardware accelerator 140 may receive argument 232 from software component 102. In this example, argument 232 may indicate and/or be used to determine a starting address 502 of position 508. As illustrated in FIG. 5, starting address 502 may correspond to and/or represent the first and/or beginning position of a sub-region of activation data set 144. Accordingly, hardware accelerator 140 may slide and/or apply filter kernel 154 across this sub-region of activation data set 144, beginning at starting address 502 of position 508. More specifically, hardware accelerator 140 may slide and/or apply filter kernel 154 horizontally across the row of data located at the top of this sub-region of activation data set 144, beginning at starting address 502 of position 508.

After completion of the top row of data, hardware accelerator 140 may continue by sliding and/or applying filter kernel 154 horizontally across the second row of data within this sub-region of activation data set 144. In one example, software component 102 may control and/or manage the movement of filter kernel 154 in the vertical direction relative to activation data set 144. In contrast, in this example, hardware accelerator 140 may control and/or manage the movement of filter kernel 154 in the horizontal direction relative to activation data set 144.

In some examples, convolution operation 500 may involve and/or implement normal convolution techniques. In such examples, the input channels of activation data set 144 may be represented as the inner most dimension of the data layout, thereby facilitating efficient mapping of the data layout to a dot product engine organization of multiplier-accumulator units. For example, convolution operation 500 may be formatted and/or represented as Output Data$Set\{N,H,W,K\}$=Activation Data$Set\{N,H,W,C\}$×Filter Kernel$\{Fh,Fw,K,C\}$.

In other examples, convolution operation 500 may involve and/or implement direct convolution techniques. In such examples, the height and width of activation data set 144 may be represented as the inner most dimensions of the data layout to facilitate depth-wise convolution. For example, convolution operation 500 may be formatted and/or represented as Output Data$Set\{N,K,H,W\}$=Activation Data$Set\{N,C,H,W\}$×Filter Kernel$\{K,C,Fh,Fw\}$.

Figure 6:
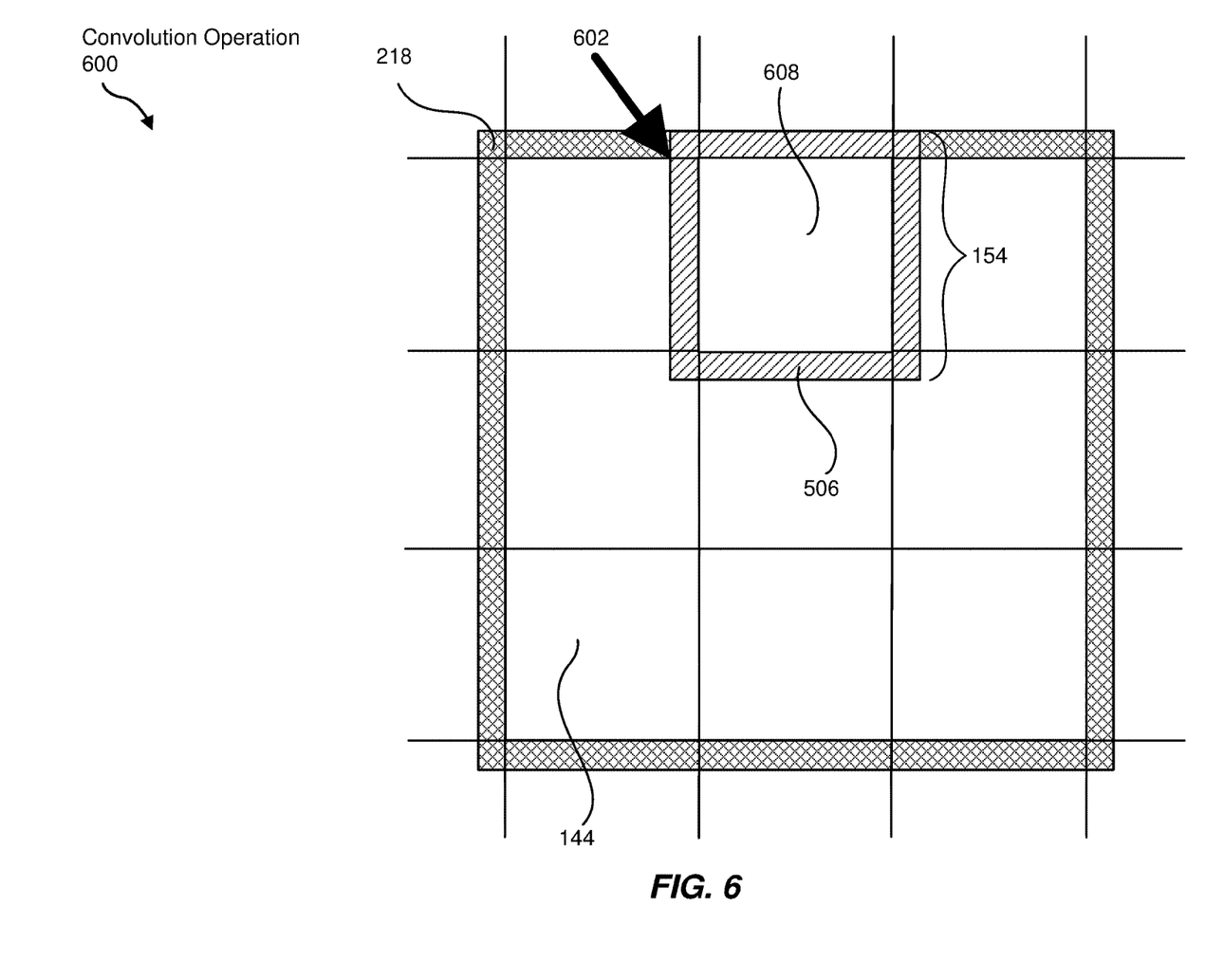
FIG. 6 is a block diagram of an exemplary convolution operation performed by an artificial neural network.

FIG. 6 illustrates an exemplary pass of convolution operation 600. As part of convolution operation 600 in FIG. 6, hardware accelerator 140 may receive argument 230 from software component 102. In this example, argument 230 may indicate and/or be used to determine that, at a position 608 of convolution operation 600, filter kernel 154 exceeds at least one boundary of activation data set 144. In other words, argument 230 may indicate and/or be used to determine that, at position 608 of convolution operation 600, filter kernel 154 envelopes and/or covers an area or scope outside and/or beyond the boundaries of activation data set 144. Accordingly, and as illustrated in FIG. 6, some of the data over which filter kernel 154 is slid and/or applied at position 608 is outside and/or beyond the boundaries of activation data set 144.

Continuing with this example, argument 230 may include and/or identify four parameters that correspond to and/or represent all sides of the sub-region of activation data set 144 undergoing convolution at position 608. For example, argument 230 may indicate that the top side at position 608 exceeds the top boundary of activation data set 144 and thus necessitates padding data to support same convolution. In this example, argument 230 may also indicate that the left, right, and/or bottom sides at position 608 do not necessitate any padding data to support same convolution. The reason that padding data is necessary at the top side of position 608 may be that same convolution consumes more input data than is produced as output data. So, to maintain the same dimensions from input to output, hardware accelerator 140 may need to generate and/or apply that padding data to the top side of position 608 for convolution operation 600.

Additionally or alternatively, hardware accelerator 140 may receive argument 232 from software component 102. In this example, argument 232 may indicate and/or be used to determine a starting address 602 of position 608. As illustrated in FIG. 6, starting address 602 may correspond to and/or represent the first and/or beginning position of a sub-region of activation data set 144. Accordingly, hardware accelerator 140 may slide and/or apply filter kernel 154 across this sub-region of activation data set 144, beginning at starting address 602 of position 608. More specifically, hardware accelerator 140 may slide and/or apply filter kernel 154 horizontally across the row of data located at the top of this sub-region of activation data set 144, beginning at starting address 602 of position 608.

In one example, argument 232 may compensate, offset, and/or adjust starting address 602 of position 608 to avoid and/or bypass padding data 218 at the top of position 608. In other words, argument 232 may account for the overlap of padding data 218 and halo 506 such that the first convolution pass by filter kernel 154 is made, performed, and/or executed across the first and/or top row of data within the sub-region of activation data set 144. As a result, hardware accelerator 140 may increase the efficiency convolution operation 600 by preventing kernel filter 154 from making, performing and/or executing passes across pure padding data.

Figure 7:
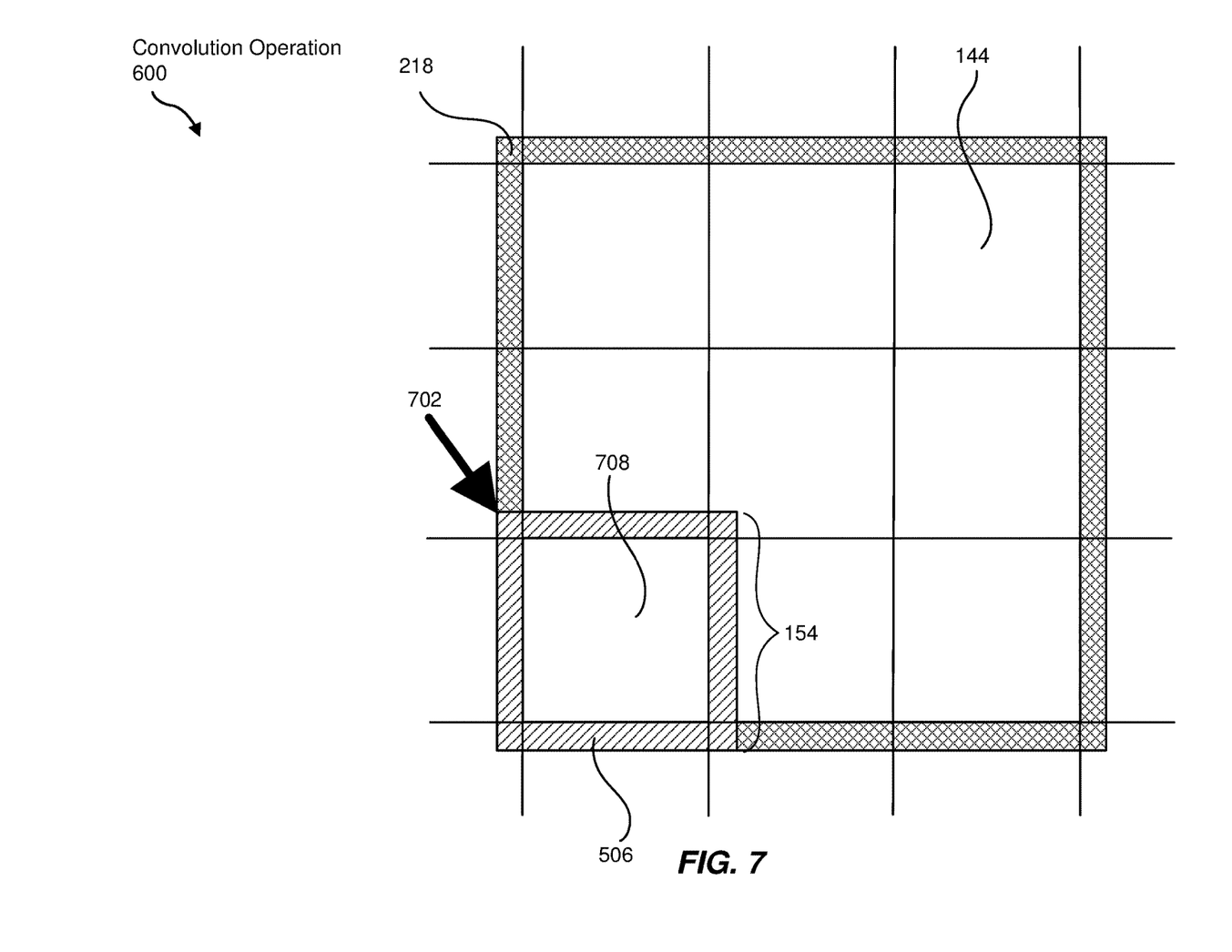
FIG. 7 is a block diagram of an exemplary convolution operation performed by an artificial neural network.

FIG. 7 illustrates another pass of exemplary convolution operation 700. As part of convolution operation 600 in FIG. 7, hardware accelerator 140 may receive argument 230 from software component 102. In this example, argument 230 may indicate and/or be used to determine that, at a position 708 of convolution operation 600, filter kernel 154 exceeds at least one boundary of activation data set 144. In other words, argument 230 may indicate and/or be used to determine that, at position 708 of convolution operation 600, filter kernel 154 envelopes and/or covers an area or scope outside and/or beyond the boundaries of activation data set 144. Accordingly, and as illustrated in FIG. 7, some of the data over which filter kernel 154 is slid and/or applied at position 708 is outside and/or beyond the boundaries of activation data set 144.

Continuing with this example, argument 230 may include and/or identify four parameters that correspond to and/or represent all sides of the sub-region of activation data set 144 undergoing convolution at position 708. For example, argument 230 may indicate that the left and bottom sides at position 708 exceeds the left and bottom boundaries of activation data set 144 and thus necessitates padding data to support same convolution. In this example, argument 230 may also indicate that the top and right sides at position 708 do not necessitate any padding data to support same convolution. The reason that padding data is necessary at the left and bottom sides of position 708 may be that same convolution consumes more input data than is produced as output data. So, to maintain the same dimensions from input to output, hardware accelerator 140 may need to generate and/or apply that padding data to the top side of position 708 for convolution operation 600.

Additionally or alternatively, hardware accelerator 140 may receive argument 232 from software component 102. In this example, argument 232 may indicate and/or be used to determine a starting address 702 of position 708. As illustrated in FIG. 7, starting address 702 may correspond to and/or represent the first and/or beginning position of a sub-region of activation data set 144. Accordingly, hardware accelerator 140 may slide and/or apply filter kernel 154 across this sub-region of activation data set 144, beginning at starting address 702 of position 708. More specifically, hardware accelerator 140 may slide and/or apply filter kernel 154 horizontally across the row of data located at the top of this sub-region of activation data set 144, beginning at starting address 702 of position 708.

As described above in connection with FIGS. 1-7, the various systems and methods disclosed herein may be able to reduce data movement during convolution operations in ANNs. For example, instead of passing and/or transferring padding data along with an activation data set from an input layer to a convolutional layer, an ANN may be able to generate and/or account for such padding data at the convolutional layer. By doing so, the ANN may effectively simplify the link between the input layer and the convolution layer because the input layer no longer needs to prepare the padding data for the activation data set undergoing convolution at the convolution layer. As a result, the ANN may enable the computing device to conserve power and/or computing resources that would have otherwise been expended by accessing memory and/or moving padding data from the input layer to the convolution layer.

To facilitate reducing data movement during convolution operations in this way, a software component associated with the input layer may provide instructions to a hardware accelerator associated with the convolution layer. In one example, these instructions may describe the contents of a halo portion of the activation data set undergoing convolution. More specifically, these instructions may indicate to the hardware accelerator whether the halo portion undergoing convolution includes and/or contains any region outside and/or beyond the boundaries of the activation data set.

On the one hand, if the halo portion undergoing convolution does include and/or contain such a region, then hardware accelerator may be designed or programmed to generate and/or account for padding data at that region before and/or during the convolutional pass of that region. On the other hand, if the halo portion undergoing convolution does not include and/or contain such a region, then hardware accelerator may be designed or programmed to perform the convolutional pass of that region without generating and/or accounting for any padding data at that region.

In some examples, every pass across a row of data included in an activation data set may be controlled by an instruction sent from the software component to the hardware accelerator. For example, the software component may send an instruction to the hardware component. In this example, the instruction may identify and/or define the halo portion of the activation data set at a certain position of a convolution operation. Additionally or alternatively, the instruction may include and/or convey two arguments—one that corresponds to the left side of a convolution pass across a row of data included in the activation data set and another one that corresponds to the right side of the convolution pass across that row of data.

Accordingly, the software component may determine how much halo is present at each region of the activation data set undergoing convolution by the hardware accelerator. The software component may then notify the hardware accelerator of the halo present at each region of the activation data set undergoing convolution. By doing so, the hardware accelerator may be able to generate and/or account for the necessary padding data encompassed by the halo at each region of the activation data set during convolution.

In addition, the instructions sent from the software component to the hardware accelerator may describe the starting address of a particular sub-region of the activation data set. In one example, the starting address may correspond to and/or account for the halo portion of that sub-region of the activation data set. With the combination of adjusted starting address and the description of the halo portion of the sub-region undergoing convolution, the hardware accelerator may be able to perform same convolution on the activation data set without passing and/or transferring actual padding data for the activation data set from the input layer to the convolution layer.

EXAMPLE EMBODIMENTS

Example 1: A computer-implemented method comprising (1) receiving, at a hardware accelerator that supports an ANN, an activation data set that is to undergo a convolution operation via a filter kernel of the ANN, (2) receiving, at the hardware accelerator, an argument indicating that the filter kernel exceeds at least one boundary of the activation data set when slid across a certain position during the convolution operation, (3) determining, based at least in part on the argument, that the hardware accelerator is to generate padding data at the boundary of the activation data set in connection with the certain position of the filter kernel, and then (4) performing, at the hardware accelerator, the convolution operation by processing a portion of the activation data set and the padding data when the filter kernel slides across the certain position.

Example 2: The computer-implemented method of Example 1, further comprising receiving, at the hardware accelerator, an additional argument indicating a starting address of the certain position, and wherein performing the convolution operation comprises applying the filter kernel to the portion of the activation data set and the padding data at the certain position based at least in part on the additional argument.

Example 3: The computer-implemented method of Example 1, wherein the activation data set received at the hardware accelerator is devoid of padding data.

Example 4: The computer-implemented method of Example 3, further comprising generating, by the hardware accelerator, the padding data at the boundary of the activation data set in connection with the certain position of the filter kernel.

Example 5: The computer-implemented method of Example 3, further comprising storing the activation data set in a local memory device of the hardware accelerator for processing in connection with the convolution operation, and wherein performing the convolution operation comprises moving the filter kernel to the starting address of the certain position within the local memory device of the hardware accelerator to facilitate processing the portion of the activation data and the padding data.

Example 6: The computer-implemented method of Example 5, wherein generating the padding data by the hardware accelerator comprises obviating a need to transfer the padding data from an external data store to the local memory device of the hardware accelerator.

Example 7: The computer-implemented method of Example 1, further comprising (1) receiving, at the hardware accelerator, an additional argument indicating that the filter kernel does not exceed any boundaries of the activation data set when slid across an additional position during the convolution operation and then (2) determining, based at least in part on the additional argument, that the hardware accelerator is to refrain from generating additional padding data in connection with the additional position of the filter kernel, and wherein performing the convolution operation comprises processing an additional portion of the activation data set without any padding data when the filter kernel slides across the additional position.

Example 8: The computer-implemented method of Example 7, further comprising receiving, at the hardware accelerator, a further argument indicating a starting address of the additional position, and wherein performing the convolution operation comprises applying the filter kernel to the additional portion of the activation data set at the additional position based at least in part on the further argument.

Example 9: The computer-implemented method of Example 1, wherein the argument comprises at least one of (1) a count indicating the number of boundaries of the activation data set that the filter kernel exceeds when slid across the certain position during the convolution operation, (2) one or more side indicators identifying which boundaries of the activation data set that the filter kernel exceeds when slid across the certain position during the convolution operation, and/or (3) a depth indicator identifying a depth of the padding data to be generated by the hardware accelerator at the boundary of the activation data set in connection with the certain position of the filter kernel.

Example 10: The computer-implemented method of Example 1, wherein performing the convolution operation comprises generating an output data set by sliding the filter kernel across the activation data set.

Example 11: The computer-implemented method of Example 10, wherein the convolution operation comprises a same convolution operation in which (1) the activation data set contains a certain number of dimensions and (2) the output data set also contains the certain number of dimensions.

Example 12: The computer-implemented method of Example 1, further comprising providing a software component that runs on a physical processor external to the hardware accelerator, and wherein performing the convolution operation comprises (1) directing, by the hardware accelerator, the filter kernel to slide across a first dimension of the activation data set during the convolution operation and (2) directing, by the software component, the filter kernel to slide across a second dimension of the activation data set during the convolution operation.

Example 13: The computer-implemented method of Example 1, further comprising (1) providing a software component that runs on a physical processor external to the hardware accelerator, (2) selecting, by the software component, a padding value to use in generating the padding data at the boundary of the activation data set, and (3) directing, by the software component, the hardware accelerator to generate the padding data using the padding value selected by the software component.

Example 14: A system comprising (1) a physical processor that executes a software component and (2) a hardware accelerator that supports an artificial neural network (ANN) and is communicatively coupled to the software component executed by the physical processor, wherein the hardware accelerator (A) receives an activation data set that is to undergo a convolution operation via a filter kernel of the ANN, (B) receives, from the software component, an argument indicating that the filter kernel exceeds at least one boundary of the activation data set when slid across a certain position during the convolution operation, (C) determines, based at least in part on the argument, that the hardware accelerator is to generate padding data at the boundary of the activation data set in connection with the certain position of the filter kernel, and then (D) performs the convolution operation by processing a portion of the activation data set and the padding data when the filter kernel slides across the certain position.

Example 15: The system of Example 14, wherein the hardware accelerator (1) receives an additional argument indicating a starting address of the certain position and (2) applies the filter kernel to the portion of the activation data set and the padding data at the certain position based at least in part on the additional argument.

Example 16: The system of Example 14, wherein the activation data set received at the hardware accelerator is devoid of padding data.

Example 17: The system of Example 16, wherein the hardware accelerator generates the padding data at the boundary of the activation data set in connection with the certain position of the filter kernel.

Example 18: The system of Example 16, wherein the hardware accelerator (1) stores the activation data set in a local memory device for processing in connection with the convolution operation and (2) moves the filter kernel to the starting address of the certain position within the local memory device to facilitate processing the portion of the activation data and the padding data.

Example 19: The system of Example 18, wherein, by generating the padding data, the hardware accelerator obviates a need to transfer the padding data from an external data store to the local memory device.

Example 20: A non-transitory, computer-readable medium comprising computer-readable instructions that, when executed by at least one processor of a computing device, cause the computing device to (1) receive, at a hardware accelerator that supports an ANN, an activation data set that is to undergo a convolution operation via a filter kernel of the ANN, (2) receive, at the hardware accelerator, an argument indicating that the filter kernel exceeds at least one boundary of the activation data set when slid across a certain position during the convolution operation, (3) determine, based at least in part on the argument, that the hardware accelerator is to generate padding data at the boundary of the activation data set in connection with the certain position of the filter kernel, and then (4) perform, at the hardware accelerator, the convolution operation by processing a portion of the activation data set and the padding data when the filter kernel slides across the certain position.

In certain embodiments, one or more of the modules described herein may transform data, physical devices, and/or representations of physical devices from one form to another. For example, one or more of the modules recited herein may receive filter data and/or activation (e.g., image) data to be transformed, transform the filter data and/or activation data, output a result of the transformation to perform a convolution operation via a convolutional layer of an ANN, use the result of the transformation to provide input to one or more additional layers of the ANN, and store the result of the transformation to make predictions regarding additional inputs to the ANN. Additionally or alternatively, one or more of the modules described herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, at a hardware accelerator that supports an artificial neural network (ANN), an activation data set that is to undergo a convolution operation via a filter kernel of the ANN;
   receiving, at the hardware accelerator, an argument indicating that the filter kernel exceeds at least one boundary of the activation data set when slid across a certain position during the convolution operation;
   determining, based at least in part on the argument, that the hardware accelerator is to generate padding data at the boundary of the activation data set in connection with the certain position of the filter kernel; and
   performing, at the hardware accelerator, the convolution operation by:
      moving the filter kernel to a starting address of the certain position within a local memory device of the hardware accelerator to facilitate processing a portion of the activation data set and the padding data; and
      processing the portion of the activation data set and the padding data when the filter kernel slides across the certain position.

2. The computer-implemented method of claim 1, further comprising receiving, at the hardware accelerator, an additional argument indicating a starting address of the certain position; and
   wherein performing the convolution operation comprises applying the filter kernel to the portion of the activation data set and the padding data at the certain position based at least in part on the additional argument.

3. The computer-implemented method of claim 2, wherein the activation data set received at the hardware accelerator is devoid of padding data.

4. The computer-implemented method of claim 3, further comprising generating, by the hardware accelerator, the padding data at the boundary of the activation data set in connection with the certain position of the filter kernel.

5. The computer-implemented method of claim 3, further comprising storing the activation data set in the local memory device of the hardware accelerator for processing in connection with the convolution operation.

6. The computer-implemented method of claim 5, wherein generating the padding data by the hardware accelerator comprises obviating a need to transfer the padding data from an external data store to the local memory device of the hardware accelerator.

7. The computer-implemented method of claim 1, further comprising:
   receiving, at the hardware accelerator, an additional argument indicating that the filter kernel does not exceed any boundaries of the activation data set when slid across an additional position during the convolution operation; and
   determining, based at least in part on the additional argument, that the hardware accelerator is to refrain from generating additional padding data in connection with the additional position of the filter kernel; and wherein performing the convolution operation comprises processing an additional portion of the activation data set without any padding data when the filter kernel slides across the additional position.

8. The computer-implemented method of claim 7, further comprising receiving, at the hardware accelerator, a further argument indicating a starting address of the additional position; and
wherein performing the convolution operation comprises applying the filter kernel to the additional portion of the activation data set at the additional position based at least in part on the further argument.

9. The computer-implemented method of claim 1, wherein the argument comprises at least one of:
a count indicating the number of boundaries of the activation data set that the filter kernel exceeds when slid across the certain position during the convolution operation;
one or more side indicators identifying which boundaries of the activation data set that the filter kernel exceeds when slid across the certain position during the convolution operation; or
a depth indicator identifying a depth of the padding data to be generated by the hardware accelerator at the boundary of the activation data set in connection with the certain position of the filter kernel.

10. The computer-implemented method of claim 1, wherein performing the convolution operation comprises generating an output data set by sliding the filter kernel across the activation data set.

11. The computer-implemented method of claim 10, wherein the convolution operation comprises a same convolution operation in which:
the activation data set contains a certain number of dimensions; and
the output data set also contains the certain number of dimensions.

12. The computer-implemented method of claim 1, further comprising providing a software component that runs on a physical processor external to the hardware accelerator; and
wherein performing the convolution operation comprises:
directing, by the hardware accelerator, the filter kernel to slide across a first dimension of the activation data set during the convolution operation; and
directing, by the software component, the filter kernel to slide across a second dimension of the activation data set during the convolution operation.

13. The computer-implemented method of claim 1, further comprising:
providing a software component that runs on a physical processor external to the hardware accelerator;
selecting, by the software component, a padding value to use in generating the padding data at the boundary of the activation data set; and
directing, by the software component, the hardware accelerator to generate the padding data using the padding value selected by the software component.

14. A system comprising:
a physical processor that executes a software component; and
a hardware accelerator that supports an artificial neural network (ANN) and is communicatively coupled to the software component executed by the physical processor, wherein the hardware accelerator:
receives an activation data set that is to undergo a convolution operation via a filter kernel of the ANN;
receives, from the software component, an argument indicating that the filter kernel exceeds at least one boundary of the activation data set when slid across a certain position during the convolution operation;
determines, based at least in part on the argument, that the hardware accelerator is to generate padding data at the boundary of the activation data set in connection with the certain position of the filter kernel; and
performs the convolution operation by:
moving the filter kernel to a starting address of the certain position within a local memory device of the hardware accelerator to facilitate processing a portion of the activation data set and the padding data; and
processing the portion of the activation data set and the padding data when the filter kernel slides across the certain position.

15. The system of claim 14, wherein the hardware accelerator:
receives an additional argument indicating a starting address of the certain position; and
applies the filter kernel to the portion of the activation data set and the padding data at the certain position based at least in part on the additional argument.

16. The system of claim 15, wherein the activation data set received at the hardware accelerator is devoid of padding data.

17. The system of claim 16, wherein the hardware accelerator generates the padding data at the boundary of the activation data set in connection with the certain position of the filter kernel.

18. The system of claim 16, wherein the hardware accelerator stores the activation data set in a local memory device for processing in connection with the convolution operation.

19. The system of claim 18, wherein, by generating the padding data, the hardware accelerator obviates a need to transfer the padding data from an external data store to the local memory device.

20. A non-transitory, computer-readable medium comprising computer-readable instructions that, when executed by at least one processor of a computing device, cause the computing device to:
receive, at a hardware accelerator that supports an artificial neural network (ANN), an activation data set that is to undergo a convolution operation via a filter kernel of the ANN;
receive, at the hardware accelerator, an argument indicating that the filter kernel exceeds at least one boundary of the activation data set when slid across a certain position during the convolution operation;
determine, based at least in part on the argument, that the hardware accelerator is to generate padding data at the boundary of the activation data set in connection with the certain position of the filter kernel; and
perform, at the hardware accelerator, the convolution operation by:
moving the filter kernel to a starting address of the certain position within a local memory device of the hardware accelerator to facilitate processing a portion of the activation data set and the padding data; and
processing the portion of the activation data set and the padding data when the filter kernel slides across the certain position.

* * * * *